(12) United States Patent
Wu

(10) Patent No.: US 10,590,971 B2
(45) Date of Patent: Mar. 17, 2020

(54) OFFSET FASTENER

(71) Applicant: HANWIT PRECISION INDUSTRIES LTD., New Taipei (TW)

(72) Inventor: Ming-De Wu, New Taipei (TW)

(73) Assignee: Hanwit Precision Industries Ltd., New Taipei (TW)

( * ) Notice: Subject to any disclaimer, the term of this patent is extended or adjusted under 35 U.S.C. 154(b) by 187 days.

(21) Appl. No.: 15/814,992

(22) Filed: Nov. 16, 2017

(65) Prior Publication Data

US 2018/0258966 A1 Sep. 13, 2018

(30) Foreign Application Priority Data

Mar. 9, 2017 (TW) .............................. 106107828 A

(51) Int. Cl.
| | |
|---|---|
| F16B 5/02 | (2006.01) |
| F16B 21/07 | (2006.01) |
| F16B 2/18 | (2006.01) |
| F16B 21/16 | (2006.01) |
| F16B 19/10 | (2006.01) |
| F16B 2/02 | (2006.01) |

(52) U.S. Cl.
CPC ............ F16B 5/0208 (2013.01); F16B 2/185 (2013.01); F16B 5/0266 (2013.01); F16B 19/109 (2013.01); F16B 21/071 (2013.01); F16B 21/165 (2013.01); F16B 2/02 (2013.01)

(58) Field of Classification Search
CPC ...... F16B 2/185; F16B 5/0208; F16B 5/0266; F16B 19/109; F16B 21/071; F16B 21/165; F16B 35/041; F16B 35/06; F16B 5/02

USPC ................. 411/296, 299, 347–348, 398, 422
See application file for complete search history.

(56) References Cited

U.S. PATENT DOCUMENTS

| | | | | | |
|---|---|---|---|---|---|
| 3,747,168 | A | * | 7/1973 | Snarskis ................. | F16B 5/025 411/349 |
| 4,553,890 | A | * | 11/1985 | Gulistan ............... | F16B 41/002 411/318 |
| 7,147,420 | B2 | * | 12/2006 | Baus ..................... | F16B 19/109 411/347 |
| 2006/0113504 | A1 | * | 6/2006 | Tollin ..................... | F16B 2/185 251/257 |

* cited by examiner

*Primary Examiner* — Roberta S Delisle
(74) *Attorney, Agent, or Firm* — Muncy, Geissler, Olds & Lowe, P.C.

(57) ABSTRACT

A offset fastener includes socket including socket hole and bottom positioning portion affixed to first panel member, retaining shaft including shaft body axially movably positioned in socket hole and transversely movable relative to socket between center position and offset position, spring chamber transversely defined in shaft body, spring member mounted in spring chamber and floating ball supported on spring member and forced by spring member into abutment against an inside wall of socket that defines socket hole, positioning member axially extended from shaft body for inserting through positioning hole of second panel member when retaining shaft is disposed in center position and for locking retaining shaft to positioning hole when retaining shaft is moved to offset position, and stopper member fastened to retaining shaft and operable to move stopper member between center position and offset position.

9 Claims, 15 Drawing Sheets

OFFSET FASTENER

This application claims the priority benefit of Taiwan patent application number 106107828, filed on Mar. 9, 2017.

BACKGROUND OF THE INVENTION

1. Field of the Invention

The present invention relates to floating fastener mounting technology and more particularly, to an offset fastener for mounting at a first panel member to detachably lock the first panel member to a positioning hole of the second panel member, which comprises a socket affixed to the first panel member, a retaining shaft mounted in the socket and movable between a center position where the retaining shaft is movable in and out of the positioning hole of the second panel member and an offset position where the retaining shaft is locked to the positioning hole of the second panel member.

2. Description of the Related Art

When joining metal panel members, fastening devices respectively formed of a lock screw, a rotary knob and a washer may be used. During application, the lock screw, rotary knob and washer of each fastening device are assembled and then mounted at a first metal panel member. When fastening the first metal panel member to a second metal panel member, rotate the rotary knob of each fastening device to drive the respective lock screw into a respective mounting screw hole at the second metal panel member, and then use a hand tool to fasten tight the lock screw. This multiple metal panel member fastening method can be used in a telecommunication cabinet, industrial computer, working machine or other situations where multiple metal panel members are to be fastened in a stack.

FIG. 15 illustrates the application of a panel member fastening device D for detachably fasten a first panel member E to a second panel member E1. As illustrated, the panel member fastening device D comprises a mounting socket C that has a bottom mounting portion C2 affixed to the first panel member E and a top stop flange C1, a locking bolt A1 axially movably inserted through the mounting socket C for threading into the second panel member E1 with a bolt head A11 thereof stopped above the top stop flange C1 of the mounting socket C, a spring member B mounted around the threaded bolt shank A1 within the mounting socket C and stopped between the bottom mounting portion C2 of the mounting socket C and the bolt head A11 of the locking bolt A1, and an operating cap member A fixedly fastened to the bolt head A11 of the locking bolt A1 and having a bottom hook portion A2 for hooking on a bottom side of the top stop flange C1 of the mounting socket C to prohibit the locking bolt A1 from falling out of the mounting socket C.

When the panel member fastening device D is used in a telecommunication cabinet, industrial computer or working machine to lock a first panel member E to a second panel member E1, it requires much labor and time to lock the first panel member E to the second panel member E1 or to unlock the first panel member E from the second panel member E1. Further, a hand tool is necessary for driving the locking bolt A1 into or out of the second panel member E1. It will be difficult to drive the locking bolt A1 into or out of the second panel member E1 without a proper hand tool.

Therefore, there is a strong demand for a fastener for detachably fastening two panel members in a stack that eliminates the drawbacks of the aforesaid prior art designs.

SUMMARY OF THE INVENTION

The present invention has been accomplished under the circumstances in view. It is therefore the main object of the present invention to provide an offset fastener for mounting at a first panel member to detachably lock the first panel member to a second panel member, which improves the use of inconvenience, achieves easy operation and assembly and enhances positioning accuracy.

To achieve this and other objects of the present invention, an offset fastener is affixed to a mounting through hole of a first panel member for detachably locking the first panel member to a positioning hole of a second panel member, comprising a socket and a retaining shaft. The socket comprises a socket hole, and a positioning portion located at a bottom side thereof for fixation to the mounting through hole of the first panel member. The retaining shaft comprises a shaft body axially movably positioned in the socket hole of the socket and transversely movable in the socket hole of the socket between a center position and an offset position, at least one spring chamber transversely defined in the shaft body and exposed to the outside of the shaft body, each spring chamber having accommodated therein a spring member and a floating ball that is supported on the spring member and forced by the spring member into abutment against an inside wall of the socket that defines the socket hole, a positioning member axially extended from one end of the shaft body and adapted for inserting through the positioning hole of the second panel member when the retaining shaft is disposed in the center position and for locking the retaining shaft to the positioning hole of the second panel member when the retaining shaft is moved to the offset position.

The offset fastener further comprises a stopper member fastened to the retaining shaft and operable to move the stopper member between the center position and the offset position. After installation of the spring member and the floating ball in the spring chamber of the shaft body of the retaining shaft, the shaft body is mounted in the socket hole of the socket, and then the stopper member is fastened to the retaining shaft and stopped outside socket to keep the shaft body positively in the socket hole, and thus, the installation of the offset fastener can be done rapidly and conveniently. Since the shaft body is positively held in the socket hole of the socket, the socket does not require any extra structural design in the socket hole to stop the floating ball in place, saving the cost.

DETAILED DESCRIPTION OF THE PREFERRED EMBODIMENT

Figure 1:
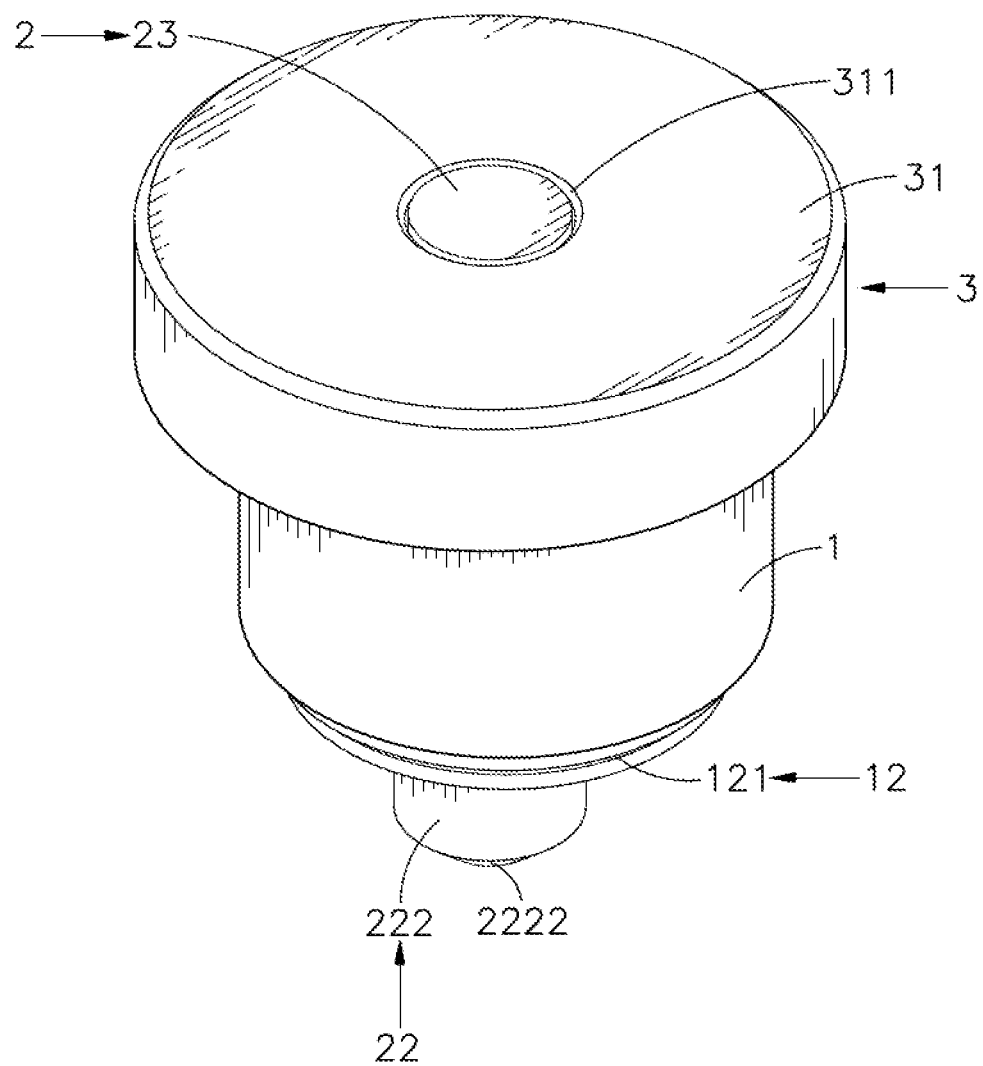
FIG. 1 is an oblique top elevational view of an offset fastener in accordance with a first embodiment of the present invention.
Figure 2:
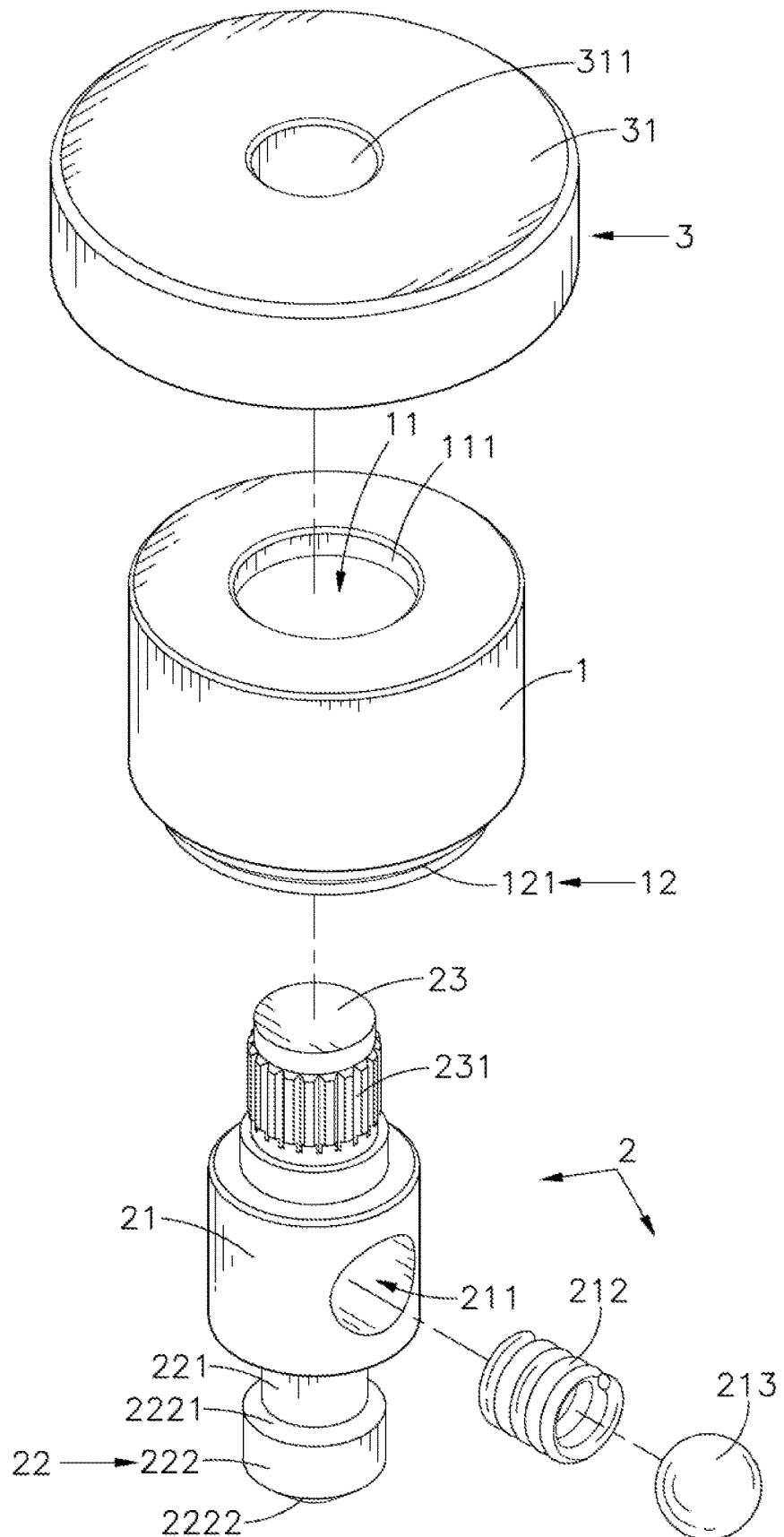
FIG. 2 is an exploded view of the offset fastener in accordance with the first embodiment of the present invention.
Figure 3:
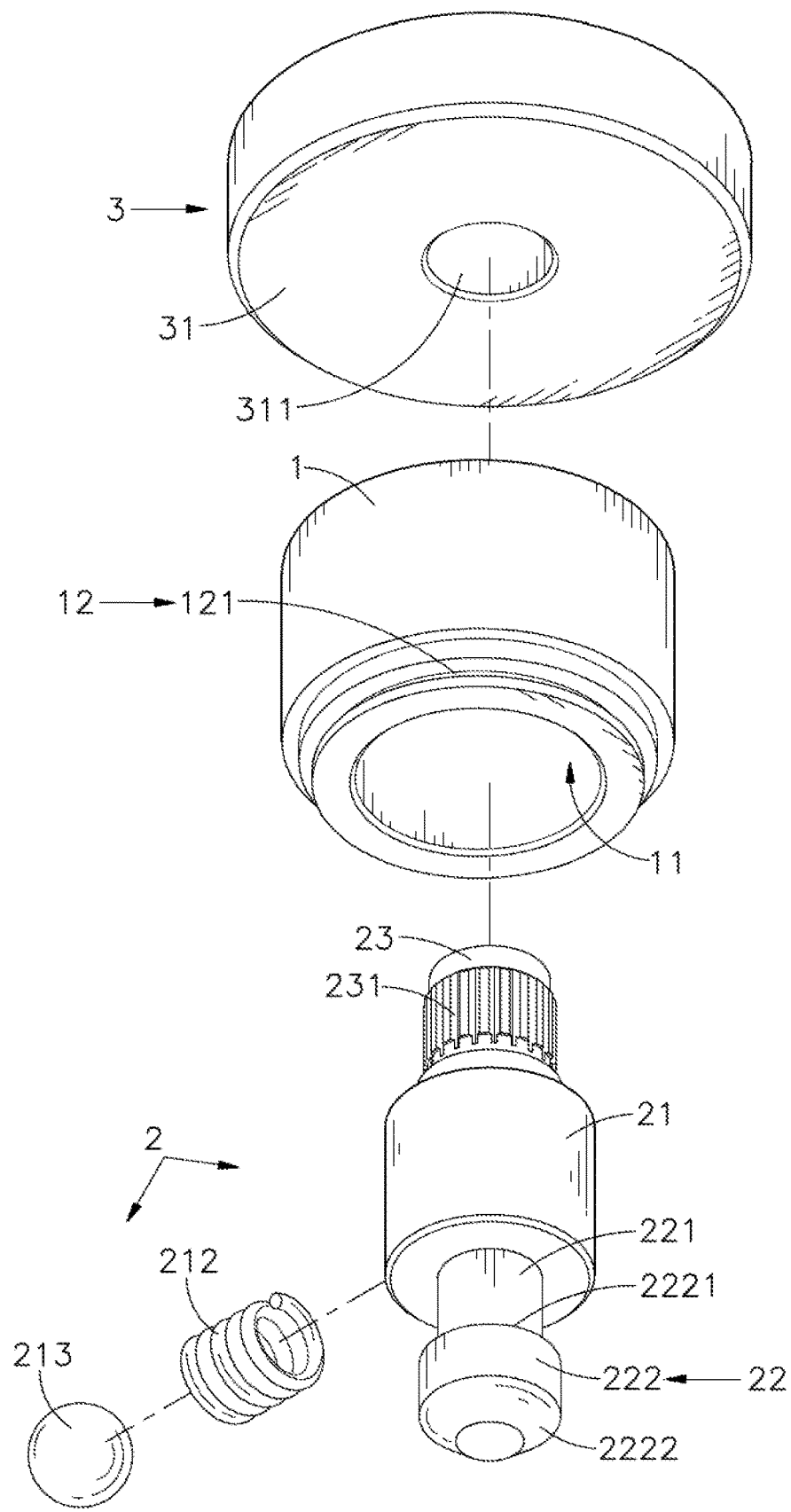
FIG. 3 corresponds to FIG. 2 when viewed from another angle.

Referring to FIGS. 1-3, an offset fastener in accordance with a first embodiment of the present invention is shown. The offset fastener comprises a socket 1, a retaining shaft 2 and a stopper member 3.

The socket 1 comprises a socket hole 11, a through hole 111 cut through a top side thereof in axial communication with the socket hole 11 and having a relatively smaller diameter than the socket hole 11, an abutment surface 112 internally defined in the connection area between the through hole 111 and the socket hole 11, a positioning portion 12 located at an opposing bottom side thereof around the socket hole 11, and a locating groove 121 extended around the periphery of the positioning portion 12.

The retaining shaft 2 comprises a shaft body 21 axially disposed in the socket hole 11 of the socket 1, an spring chamber 211 transversely located on the periphery of the shaft body 21, a spring member 212 accommodated in the spring chamber 211, a floating ball 213 supported on the spring member 212 and forced by the spring member 212 to stop against an inside wall of the socket hole 11, a positioning member 22 axially located at a bottom end of the shaft body 21 and disposed outside the socket 1, and a connection rod 23 axially located at an opposing top end of the shaft body 21. The positioning member 22 comprises a positioning stem 221 axially extended from the end of the shaft body 21 and disposed outside the socket 1 and having a relatively smaller diameter than the shaft body 21, a retaining block 222 located at a bottom end of the positioning stem 221 remote from the shaft body 21, a tapered stop surface 2221 located at a top side of the retaining block 222 around the positioning stem 221, and a tapered guide surface 2222 located at an opposing bottom side of the retaining block 222. The connection rod 23 has an embossed pattern 231 around the periphery thereof.

The stopper member 3 is fastened to the retaining shaft 2 and stopped outside the socket 1, comprising a circular head body 31 and a mounting hole 311 axially cut through the center of the circular head body 31.

Further, the diameter of the through hole 111 of the socket 1 is smaller than the outer diameter of the shaft body 21 of the retaining shaft 2; the inner diameter of the socket hole 11 is greater than the outer diameter of the shaft body 21 of the retaining shaft 2.

In installation, insert the spring member 212 and the floating ball 213 into the spring chamber 211 of the shaft body 21 of the retaining shaft 2, and then insert the retaining shaft 2 downwardly into the socket 1 to keep the shaft body 21 of the retaining shaft 2 in the socket hole 11 of the socket 1. At this time, the floating ball 213 is forced out of the spring chamber 211 by the spring member 212 into abutment against the inside wall of the socket hole 11, and thus, the retaining shaft 2 is shifted to an offset position in the socket hole 11. At this time, the connection rod 23 of the retaining shaft 2 is suspending outside the through hole 111 and inserted into the mounting hole 311 in the circular head body 31 of the stopper member 3 to force the embossed pattern 231 of the connection rod 23 into positive engagement with the inside wall of the mounting hole 311 of the circular head body 31, at the same time, the bottom surface of the circular head body 31 is abutted at the top surface of the socket 1, keeping the shaft body 21 of the retaining shaft 2 positively in the socket hole 11 of the socket 1.

Figure 4:
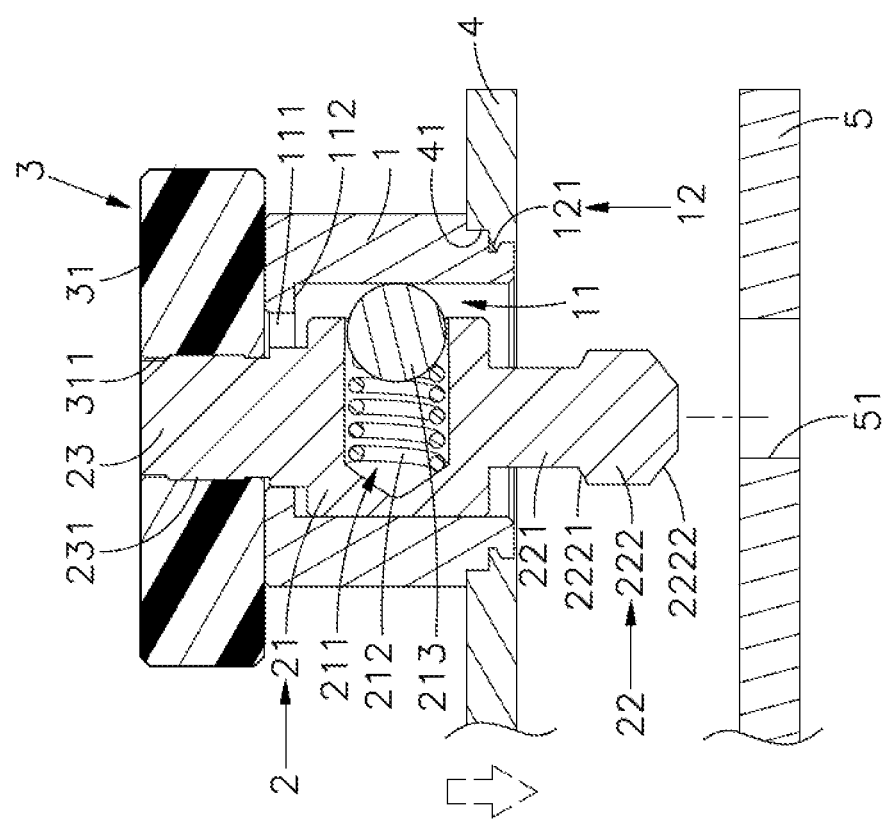
FIG. 4 is a schematic applied view of the offset fastener in accordance with the first embodiment of the present invention (I).
Figure 5:
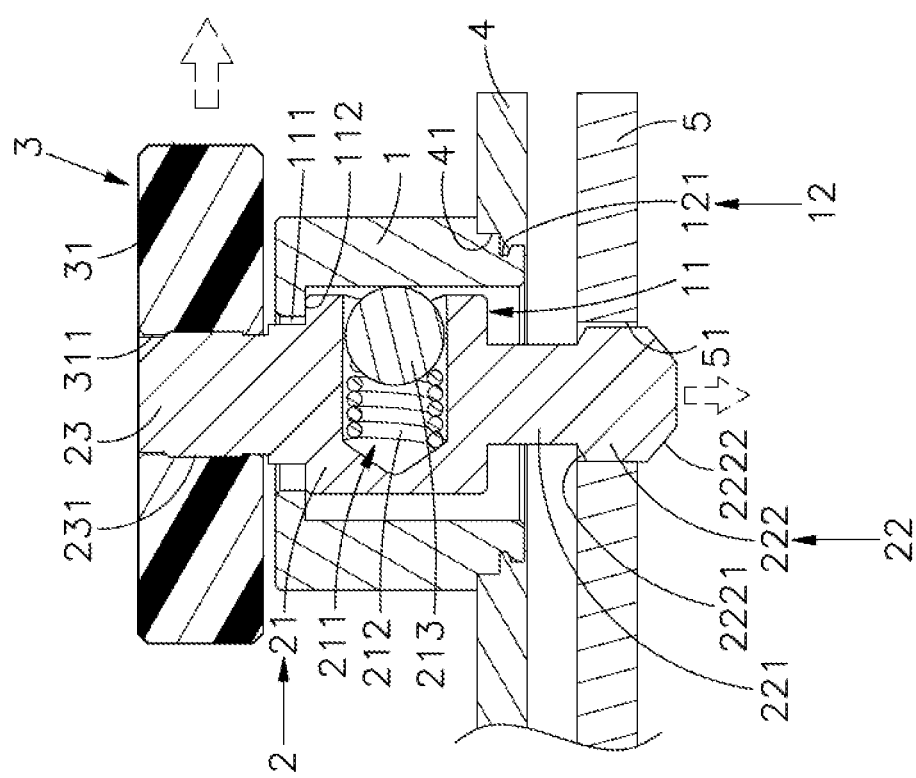
FIG. 5 is a schematic applied view of the offset fastener in accordance with the first embodiment of the present invention (II).
Figure 6:
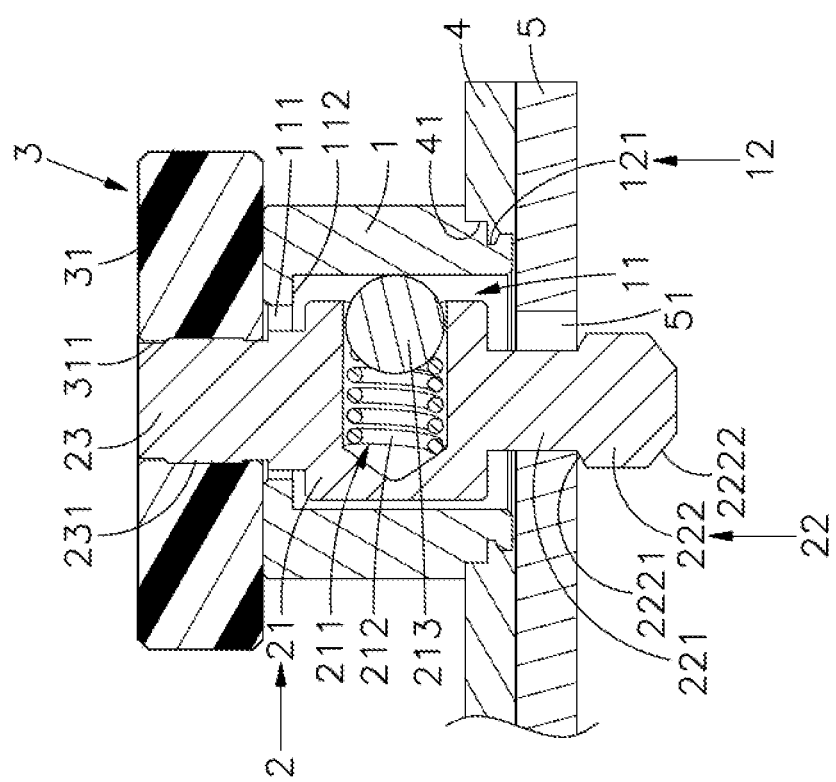
FIG. 6 is a schematic applied view of the offset fastener in accordance with the first embodiment of the present invention (III).

Referring to FIGS. 4-6, the offset fastener of the present invention can be used in a telecommunication cabinet, computer server, working machine or any other equipment with a board set, drawer or keyboard rack to fasten a to a first panel member 4 and a second panel member 5 together. The first panel member 4 can be a base frame, front panel or top cover of a telecommunication cabinet, computer server, working machine or any other equipment; the second panel member 5 can be a circuit board that carries various electronic components. Alternatively, the second panel member 5 can be a drawer or keyboard rack.

When mounting the offset fastener to the first panel member 4, stop the positioning portion 12 of the socket 1 at a top surface of the first panel member 4 around a mounting through hole 41 of the first panel member 4, and then operate a press to stamp the circular head body 31 of the stopper member 3, riveting the positioning portion 12 of the socket 1 to the mounting through hole 41 and forcing the locating groove 121 of the positioning portion 12 into positive engagement with the peripheral wall of the mounting through hole 41, and thus, the socket 1 is affixed to the first panel member 4.

The positioning portion 12 of the socket 1 is preferably riveted to the first panel member 4, however, this riveting technique is not a limitation. Surface mount technology (SMT), welding, tenon and mortise joint or other mounting techniques can be selectively used to affix the socket 1 to the first panel member 4.

When mounting the second panel member 5, aim the positioning member 22 of the retaining shaft 2 at a positioning hole 51 of the second panel member 5 (see FIG. 4), and then force the offset fastener and the first panel member 4 toward the second panel member 5. Since the floating ball 213 of the retaining shaft 2 is stopped against the inside wall of the socket hole 11, the retaining shaft 2 is disposed in an offset position in the socket hole 11, and thus, the retaining block 222 of the positioning member 22 will be stopped against a border edge of the positioning hole 51 when the offset fastener and the first panel member 4 is forced toward the second panel member 5. When continuously giving a pressure to the offset fastener and the first panel member 4 against the second panel member 5, the tapered guide surface 2222 will guide the retaining block 222 into the positioning hole 51. As the retaining block 222 is being forced into the positioning hole 51 (see FIG. 5), the retaining shaft 2 is forced sideway, and the floating ball 213 is forced by the inside wall of the socket hole 11 of the socket 1 into the inside of the spring chamber 211 in the shaft body 21 to compress the spring member 212. As soon as the retaining block 222 of the positioning member 22 passed through the positioning hole 51 of the second panel member 5 (see FIG. 6), the sideway pressure is released from the retaining shaft 2, and the floating ball 213 is immediately forced by the spring member 212 out of the spring chamber 211 and kept in abutment against the inside wall of the socket hole 11 of the socket 1, and at the same time, the tapered stop surface 2221 of the retaining block 222 is stopped at the bottom surface of the second panel member 5 around the positioning hole 51 to lock the positioning stem 221 of the positioning member 22 to the positioning hole 51 of the second panel member 5.

In actual application, the positioning member 22 of the retaining shaft 2 can be attached to the positioning hole 51 of the second panel member 5, and then give a downward pressure to the first panel member 4 to force the positioning member 22 of the retaining shaft 2 through the positioning hole 51 of the second panel member 5, and then push the first panel member 4 sideways, enabling the retaining block 222 of the positioning member 22 to be stopped at the bottom surface of the second panel member 5 around the positioning hole 51, and thus, the positioning stem 221 of the positioning member 22 is locked to the positioning hole 51 of the second panel member 5.

When wishing to remove the second panel member 5, hold the circular head body 31 of the stopper member 3 and then lift the circular head body 3. Since the diameter of the through hole 111 is smaller than the outer diameter of the shaft body 21 of the retaining shaft 2, the shaft body 21 will be stopped at the abutment surface 112 at this time, causing the socket 1 and the first panel member 4 to be lifted. When the positioning member 22 is being lifted, the tapered stop surface 2221 guides the retaining block 222 to move into the positioning hole 51 of the second panel member 5, and at the same time, the retaining shaft 2 is forced to move sideways, forcing the floating ball 213 against the spring member 212 toward the inside of the spring chamber 211 in the shaft body 21, and thus, the retaining block 222 of the positioning member 22 is moved into axial alignment with the positioning hole 51 of the second panel member 5 and then carried out of the positioning hole 51 of the second panel member 5. As soon as the retaining block 222 of the positioning member 22 is moved out of the positioning hole 51 of the second panel member 5, the floating ball 213 is force by the spring member 212 out of the spring chamber 211 and firmly stopped against the inside wall of the socket hole 11 of the socket 1, and thus, the first panel member 4 is separated from the second panel member 5.

Figure 7:
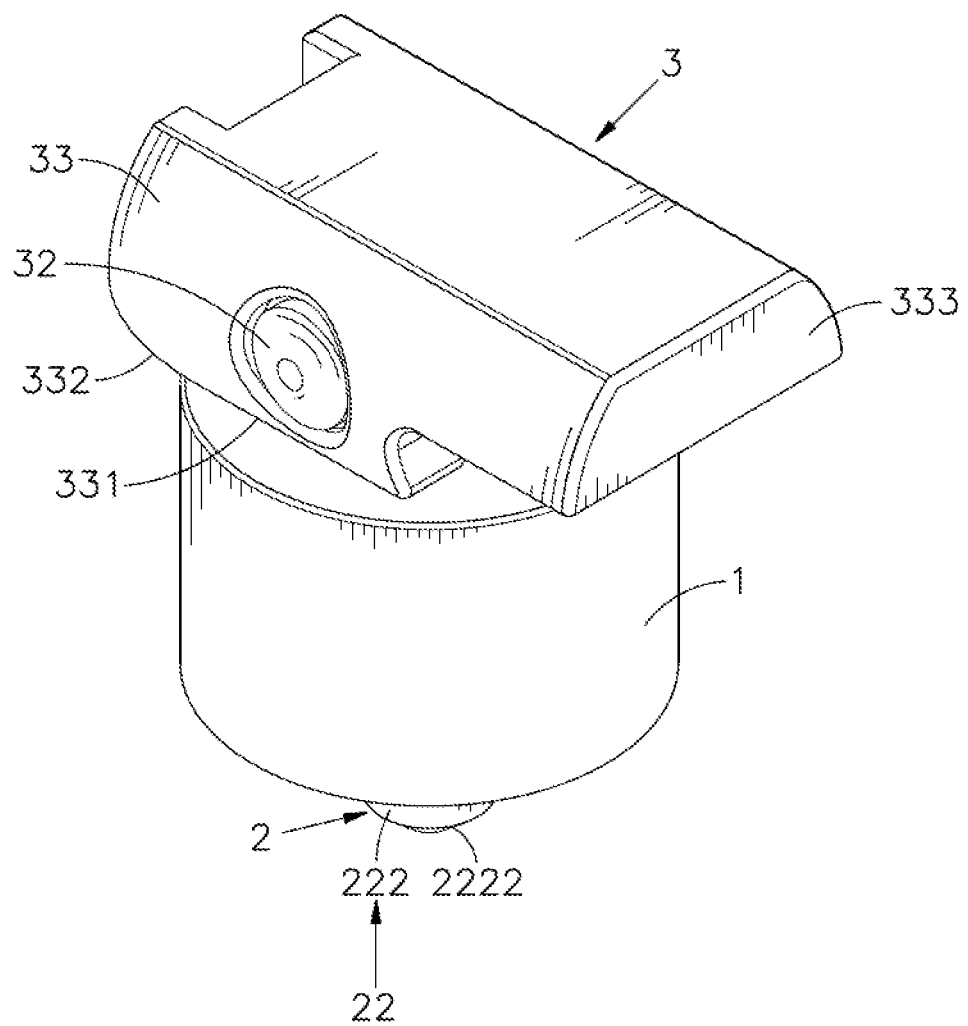
FIG. 7 is an oblique top elevational view of an offset fastener in accordance with a second embodiment of the present invention.
Figure 8:
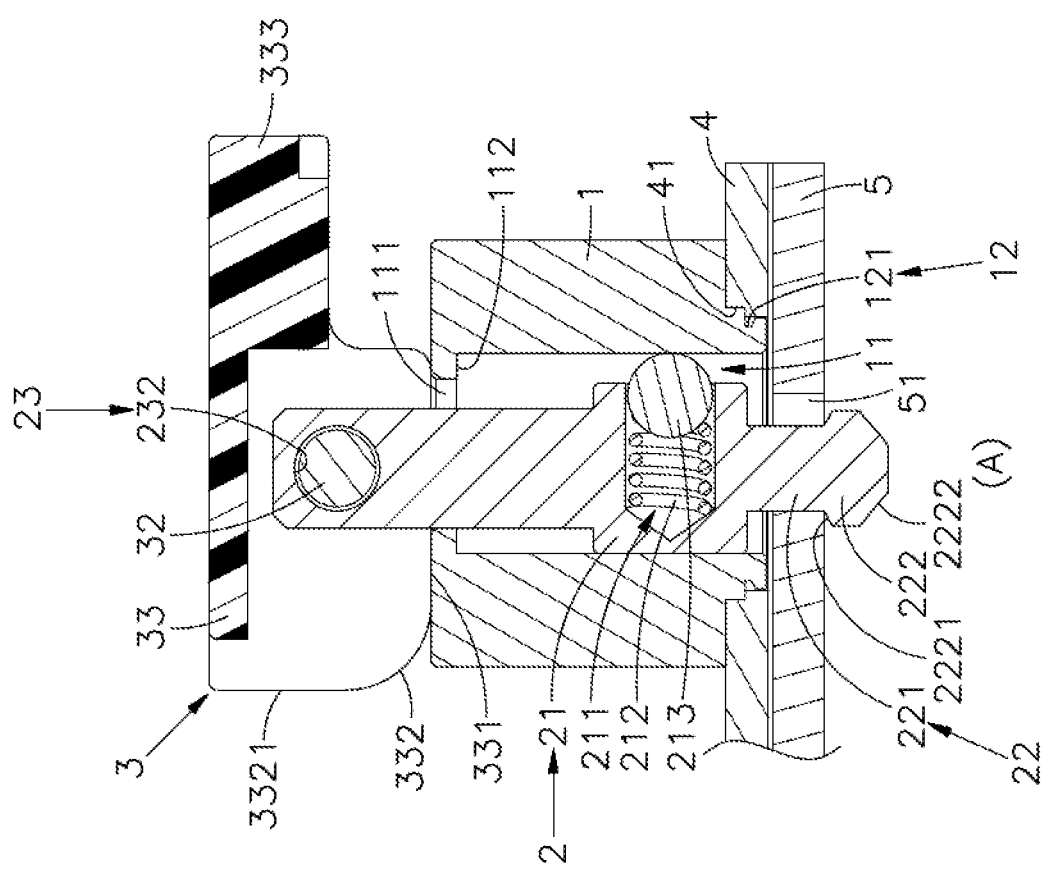
FIG. 8 is a schematic applied view of the offset fastener in accordance with the second embodiment of the present invention (I).
Figure 9:
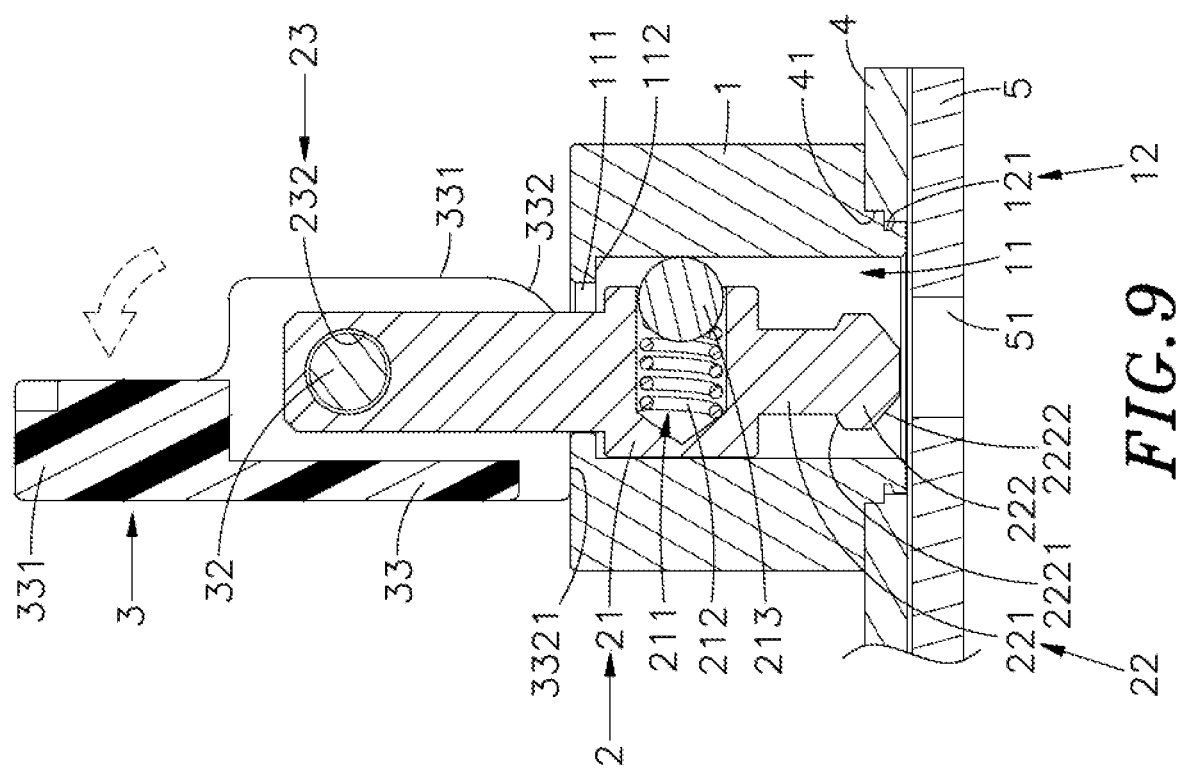
FIG. 9 is a schematic applied view of the offset fastener in accordance with the second embodiment of the present invention (II).
Figure 10:
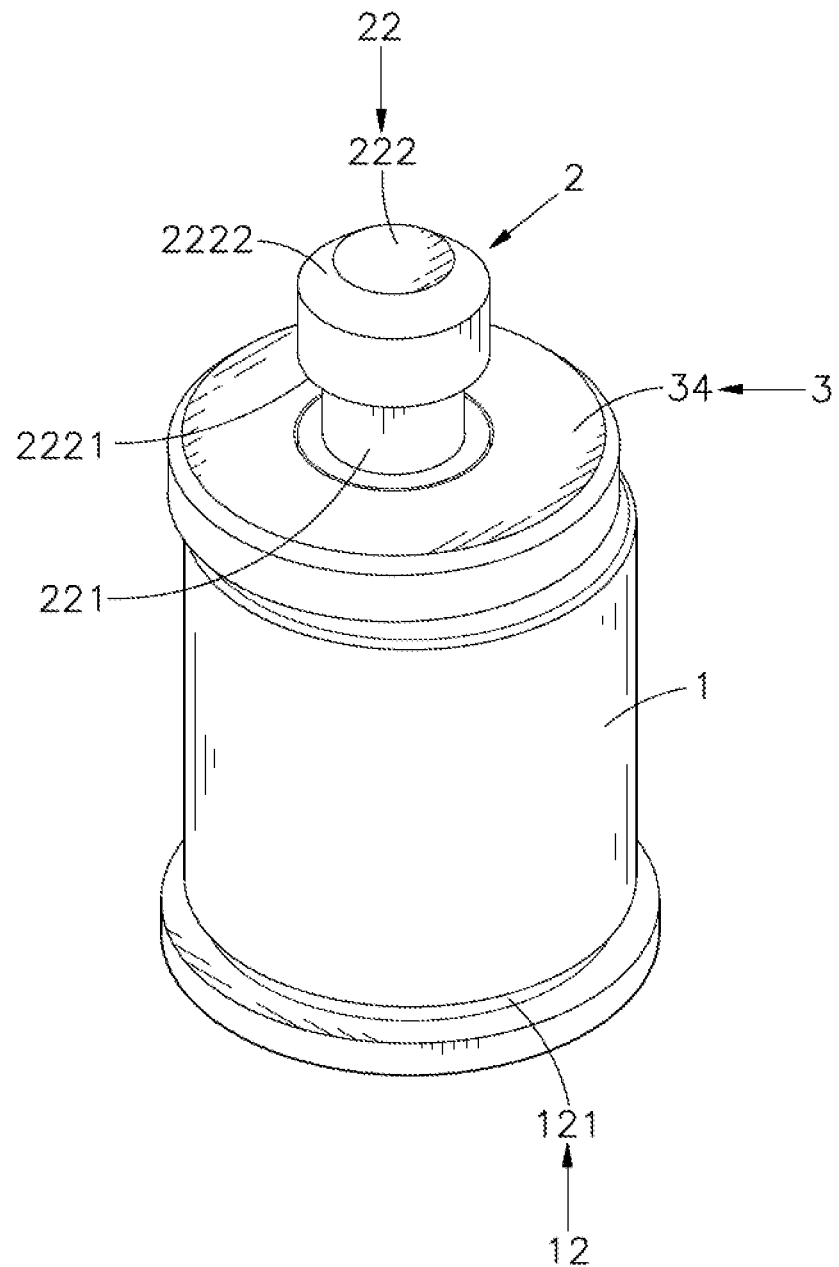
FIG. 10 is an oblique top elevational view of an offset fastener in accordance with a third embodiment of the present invention.
Figure 11:
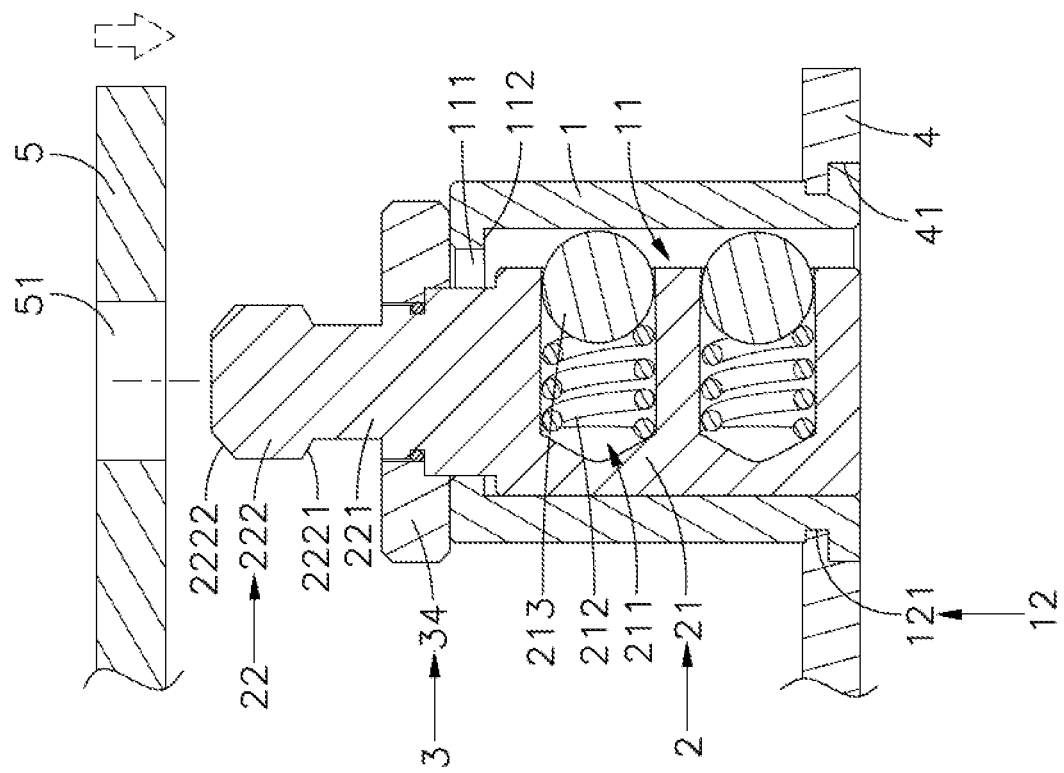
FIG. 11 is a schematic applied view of the offset fastener in accordance with the third embodiment of the present invention (I).
Figure 12:
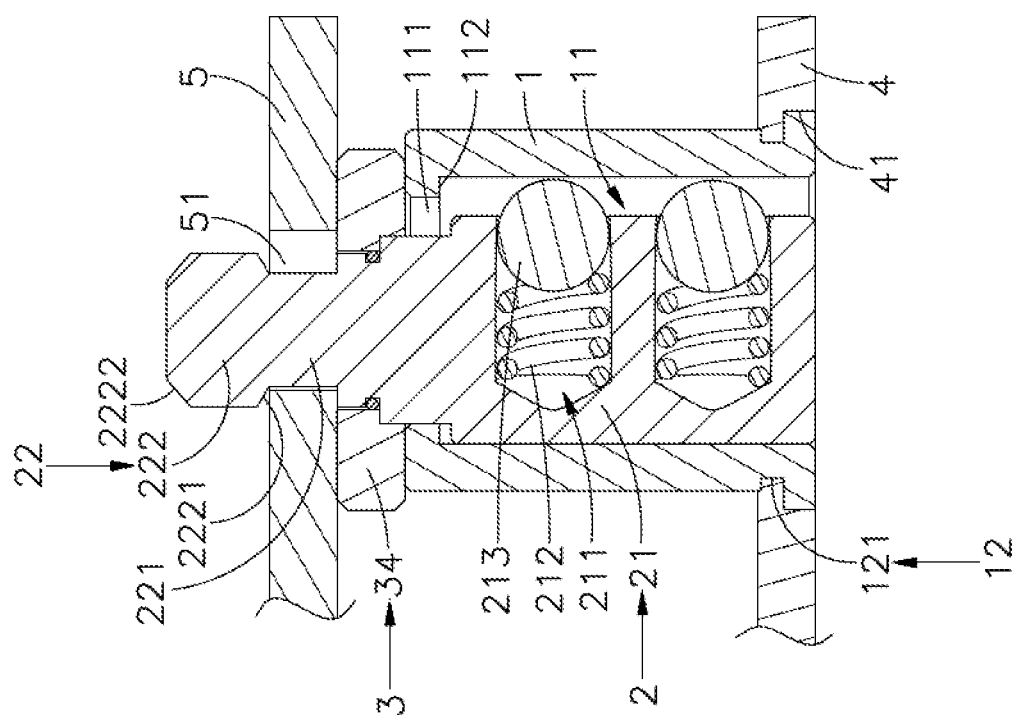
FIG. 12 is a schematic applied view of the offset fastener in accordance with the third embodiment of the present invention (II).

Referring to FIGS. 7-9, an offset fastener in accordance with a second embodiment of the present invention is shown. This second embodiment is substantially similar to the above-described first embodiment with the exceptions outlined hereinafter. The length (height) of the socket hole 11 of the socket 1 is greater than or equal to the length from the top side of the shaft body 21 of the retaining shaft 2 to the bottom side of the positioning member 22; the connection rod 23 of the retaining shaft 2 eliminate the aforesaid embossed pattern 231 but providing a pivot hole 232; the stopper member 3 eliminates the aforesaid circular head body 31 and is configured to provide a pivot axle 32 that is pivotally mounted in the pivot hole 232 and a handle 33 fastened to the pivot axle 32. The handle 33 comprises a stop wall 331 located at a bottom side thereof for stopping at the top surface of the socket 1, a stop edge 3321 located at one end of the stop wall 331, a fillet edge 332 connected between the stop edge 3321 and the stop wall 331, and a grip 333 located at an opposite end of the stop wall 331. The procedure of mounting the offset fastener of this second embodiment in the first panel member 4 and locking the first panel member 4 to the second panel member 5 is same as the aforesaid first embodiment (see FIG. 8). When unlocking the first panel member 4 from the second panel member 5, operate the grip 333 to turn the handle 33 about the axis of the pivot hole 232 (see FIG. 9) through 90-degree angle from a horizontal position to a vertical position, moving the fillet edge 332 over the surface of the socket 1 and forcing the stop edge 3321 into abutment against the socket 1, at the same time, the retaining shaft 2 is lifted by the biasing action of the handle 33 to move the tapered stop surface 2221 of the retaining block 222 over the peripheral edge of the positioning hole 51 of the second panel member 5 and to further disengage the positioning member 22 from the positioning hole 51 of the second panel member 5. At this time, the positioning member 22 of the retaining shaft 2 is completely received in the socket hole 11 of the socket 1 and the first panel member 4 is unlocked from the second panel member 5. Thus, simply biasing the handle 33 can disconnect the positioning member 22 of the retaining shaft 2 from the positioning hole 51 of the second panel member 5, facilitating unlocking operation with less effort.

Referring to FIGS. 10-14, an offset fastener in accordance with a third embodiment of the present invention is shown. This second embodiment is substantially similar to the above-described first embodiment with the exceptions outlined hereinafter. According to this third embodiment, multiple spring chambers 211 are transversely defined in the shaft body 21 of the retaining shaft at different elevations, each having mounted therein one respective spring member 212 and one respective floating ball 213; the retaining shaft 2 of this third embodiment eliminates the aforesaid connection rod 23; in installation of the retaining shaft 2 in the socket 1, the positioning member 22 of the retaining shaft 2 is upwardly inserted into the socket hole 11 of the socket 1 to extend to the outside of the through hole 111; the stopper member 3 comprises a stopper ring 34 fixedly mounted on the positioning stem 221 of the positioning member 22 and stopped at the bottom side of the socket 1 to prohibit the retaining shaft 2 from falling out of the socket hole 11 of the socket 1; after fixation of the first panel member 4 to the positioning portion 12 of the socket 1, the second panel member 5 is downwardly attached onto the positioning member 22 (see FIG. 11), enabling the retaining block 222 of the positioning member 22 to be inserted through the positioning hole 51 of the second panel member 5. At this time, the floating balls 213 are firmly stopped against the inside wall of the socket 1, the positioning stem 221 of the positioning member 22 is locked to the positioning hole 51 of the second panel member 5, and the stopper ring 34 is tightly stopped between the socket 1 and the second panel member 5 (see FIG. 12).

Figure 13:
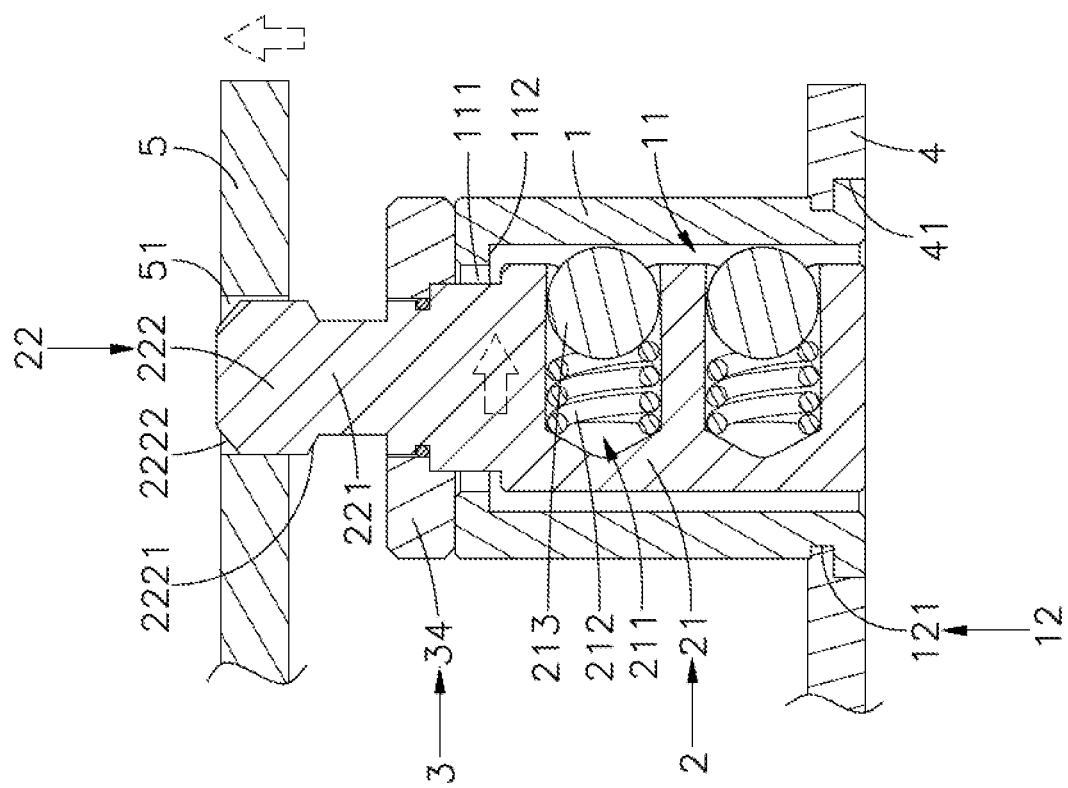
FIG. 13 is a schematic applied view of the offset fastener in accordance with the third embodiment of the present invention (III).
Figure 14:
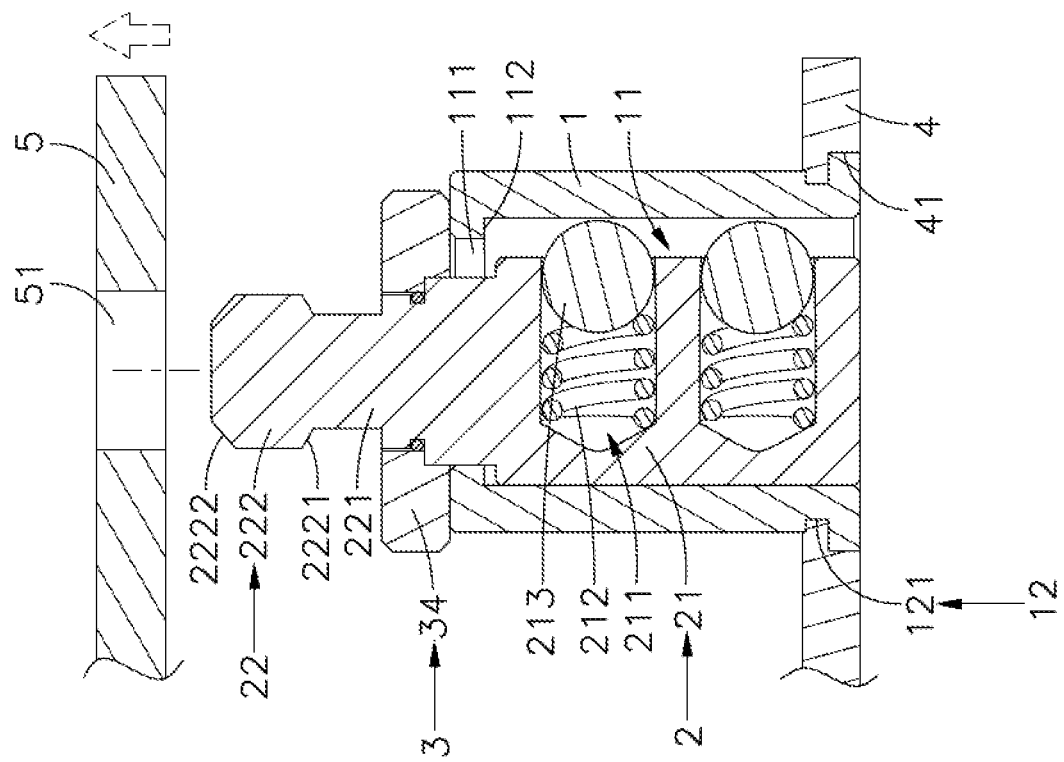
FIG. 14 is a schematic applied view of the offset fastener in accordance with the third embodiment of the present invention (IV).
Figure 15:
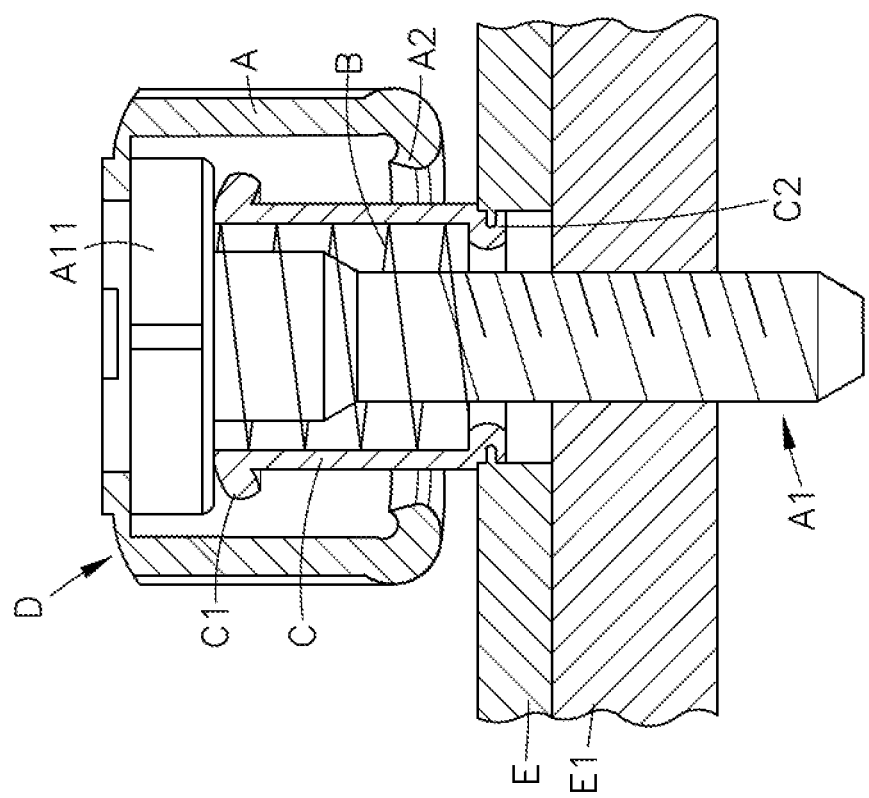
FIG. 15 is a sectional side view of a panel member fastening device according to the prior art.

When unlocking the second panel member 5, lift the second panel member 5 with force (see FIG. 13). At this time, the positioning member 22 is forced to move sideways, allowing the retaining block 222 to enter the positioning hole 51 of the second panel member 5. When continuously lifting the second panel member 5 at this time, the positioning hole 51 of the second panel member 5 is disengaged from the retaining block 222 of the positioning member 22 for allowing separation between the second panel member 5 and the first panel member 4 (see FIG. 14). This third embodiment has multiple spring chambers 211 defined in the shaft body 21 of the retaining shaft 2 for accommodating respective spring members 212 and floating balls 213 to give a relatively larger friction force to the inside wall of the socket hole 11 of the socket 1 for locking the positioning hole 51 of the second panel member 5 to the positioning stem 221 of the positioning member 22 positively (see FIG. 12), enhancing locking stability. Further, this design allows installation in the reversed direction so that the retaining shaft 2 can fit a different design of the first panel member 4 and second panel member 5 for installation in reversed direction, achieving multipurpose application.

In conclusion, the invention has advantages as follows:

(1) The shaft body 21 of the retaining shaft 2 has the spring chamber 211 transversely defined therein to accommodate the spring member 212 and the floating ball 213 such that the floating ball 213 is forced by the spring chamber 211 to abut against the inside wall of the socket hole 11 of the socket 1, allowing the retaining shaft 2 to be forced to move sideways, and thus, the positioning member 22 of the retaining shaft 2 can be vertically and rapidly connected to or disconnected from the positioning hole 51 of the second panel member 5 to lock the second panel member 5 to the first panel member 4 or to unlock the second panel member 5 from the first panel member 4, improving the use of inconvenience, achieving easy operation and assembly and enhancing positioning accuracy.

(2) After accommodation of the spring member 212 and the floating ball 213 in the spring chamber 211 of the shaft body 21 of the retaining shaft 2, the shaft body 21 is installed in the socket hole 11 of the socket 1, and then the stopper member 3 is mounted to the retaining shaft 2 and stopped outside the socket 1 to hold the shaft body 21 positively in the socket hole 11, and thus the installation of the offset fastener can be done rapidly and conveniently; since the shaft body 21 is positively held in the socket hole 11, the socket 1 does not require any extra structural design in the socket hole 11 to stop the floating ball 213 in place, saving the cost.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An offset fastener affixed to a mounting through hole of a first panel member for detachably locking said first panel member to a positioning hole of a second panel member, comprising:

a socket comprising a socket hole and a positioning portion located at a bottom side thereof for fixation to said mounting through hole of said first panel member;

a retaining shaft comprising a shaft body axially movably positioned in said socket hole of said socket and transversely movable in said socket hole of said socket between a center position and an offset position, at least one spring chamber transversely defined in said shaft body and exposed to the outside of said shaft body, each said spring chamber having accommodated therein a spring member and a floating ball, said floating ball being supported on said spring member and forced by said spring member into abutment against an inside wall of said socket that defines said socket hole, a positioning member axially extended from one end of said shaft body and adapted for inserting through said positioning hole of said second panel member when said retaining shaft is disposed in said center position and for locking said retaining shaft to said positioning hole of said second panel member when said retaining shaft is moved to said offset position; and a stopper member fastened to said retaining shaft and operable to move said stopper member between said center position and said offset position, wherein said socket further comprises a through hole cut through an opposing top side thereof in axial communication with said socket hole and having a relatively smaller diameter than said socket hole, an abutment surface internally defined in the connection area between said through hole and said socket hole for stopping against said shaft body of said retaining shaft to hold said shaft body in said socket; said retaining shaft further comprises a connection rod axially extended from an opposing end of said shaft body and extended through said through hole of said socket and connected to said stopper member outside said socket.

2. The offset fastener as claimed in claim 1, wherein said connection rod of said retaining shaft comprises an embossed pattern around the periphery thereof; said stopper member comprises a circular head body stopped outside said socket, and a mounting hole located at the center of said circular head body and fixedly fastened to said embossed pattern of said connection rod.

3. The offset fastener as claimed in claim 1, wherein said connection rod of said retaining shaft comprises a pivot hole; said stopper member comprises a pivot axle pivotally mounted in said pivot hole of said connection rod of said retaining shaft and a handle fastened to said pivot axle, said handle comprising a stop wall located at a bottom side thereof for stopping against said socket when said retaining shaft is disposed in said offset position, a stop edge located at one end of said stop wall stopping against said socket when said retaining shaft is disposed in said center position, a fillet edge connected between said stop edge and said stop wall for moving over the peripheral edge of a positioning hole of a second panel member, and a grip located at an opposite end of said stop wall and operable to bias said handle between a horizontal position and a vertical position.

4. The offset fastener as claimed in claim 1, wherein the diameter of said through hole of a socket hole is smaller than the outer diameter of said shaft body of said retaining shaft.

5. The offset fastener as claimed in claim 1, wherein the inner diameter of said socket hole of said socket is greater than the outer diameter of said shaft body of said retaining shaft.

6. The offset fastener as claimed in claim 1, wherein said socket further comprises a through hole cut through an opposing top side thereof in axial communication with said socket hole and having a relatively smaller diameter than said socket hole; said stopper member comprises a stopper ring mounted on said positioning member of said retaining shaft for stopping against said socket.

7. The offset fastener as claimed in claim 1, wherein said positioning member comprises a positioning stem axially extended from an opposing top side of said shaft body and disposed outside said socket, a retaining block located at a bottom end of said positioning stem remote from said shaft body for hooking in said positioning hole of said second panel member, a tapered stop surface located at a top side of said retaining block around said positioning stem, and a tapered guide surface located at an opposing bottom side of said retaining block.

8. The offset fastener as claimed in claim 7, wherein the taper angle of said tapered stop surface of said retaining block is smaller than the taper angle of said tapered guide surface of said retaining block.

9. The offset fastener as claimed in claim 1, wherein the outer diameter of said positioning member of said retaining shaft is smaller than the outer diameter of said shaft body.

\* \* \* \* \*